June 2, 1959 H. I. SIDES 2,889,151
FOLDING BABY SEATS FOR GROCERY CARTS

Filed July 8, 1955 3 Sheets-Sheet 1

INVENTOR.
Harold I. Sides
BY
Herman Seid
Atty.

June 2, 1959   H. I. SIDES   2,889,151
FOLDING BABY SEATS FOR GROCERY CARTS
Filed July 8, 1955   3 Sheets-Sheet 2
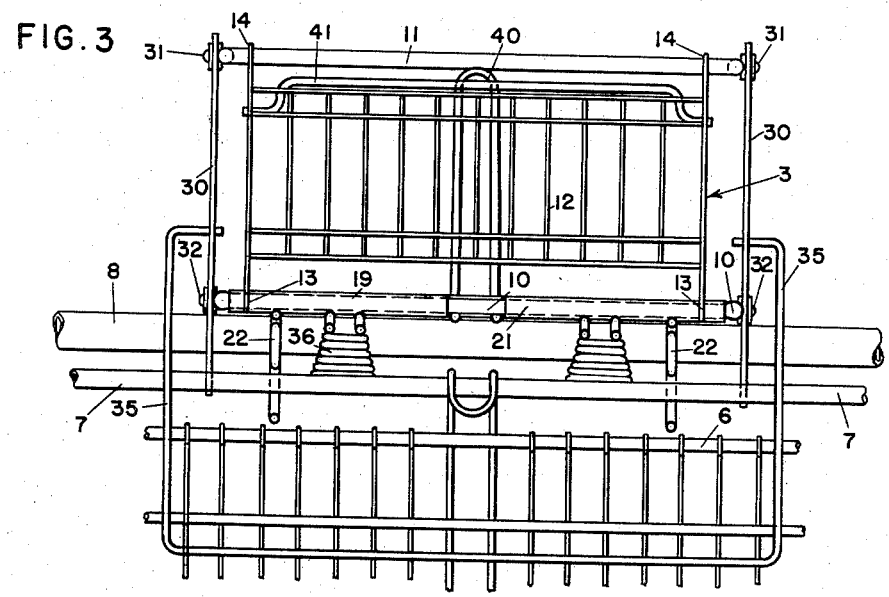
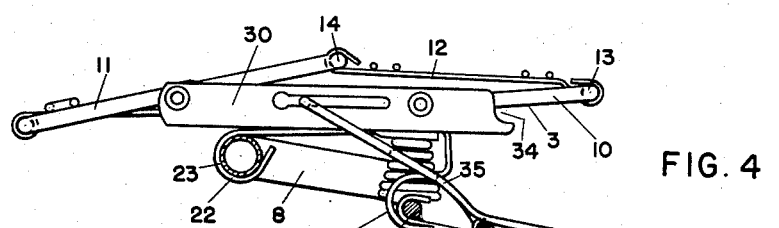
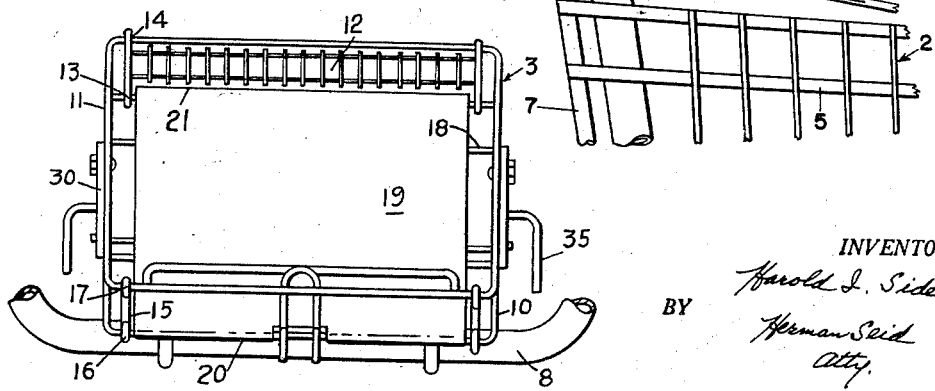
INVENTOR.
Harold I. Sides
BY Herman Seid
Atty.

June 2, 1959    H. I. SIDES    2,889,151
FOLDING BABY SEATS FOR GROCERY CARTS
Filed July 8, 1955    3 Sheets-Sheet 3
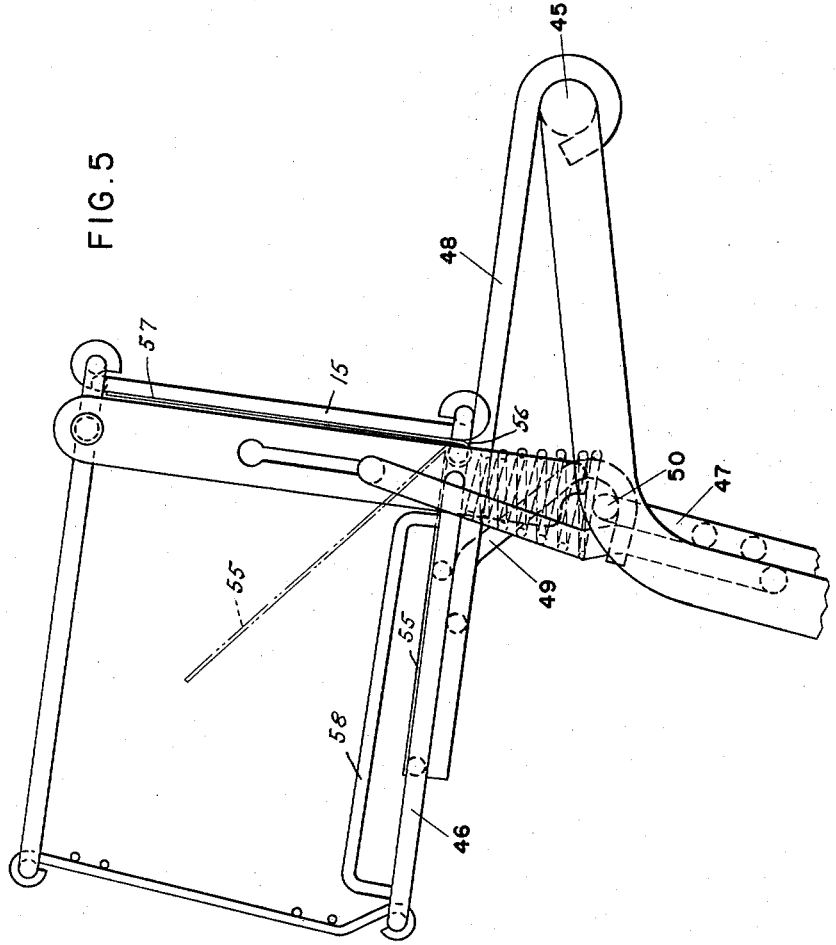
INVENTOR.
Harold I. Sides
BY Herman Seid
atty.

United States Patent Office 2,889,151
Patented June 2, 1959

2,889,151

FOLDING BABY SEATS FOR GROCERY CARTS

Harold I. Sides, Chicago, Ill., assignor of one-half to Raymond M. Sides, Northfield, Ill.

Application July 8, 1955, Serial No. 520,863

10 Claims. (Cl. 280—33.99)

This invention relates to folding baby seats for grocery carts or the like and, more particularly to a seat placed without the basket of the cart collapsible or foldable to permit telescoping or nesting of the carts during storage.

In grocery carts heretofore provided, it has been customary to place the seat within the basket. Such seats are undesirable for they decrease considerably the storage space provided by the basket. In addition, such seats are not particularly sanitary and in many cases health ordinances of various cities, etc. forbid or retard their use. Seats heretofore employed were stationary and moved up with the end gate for nesting; when such seats were of a folding type within the basket, two end gates were required which is undesirable for the seat was heavy and did not fold easily.

The chief object of the present invention is to provide a folding baby seat for grocery carts which eliminates the disadvantages inherent in seats heretofore used.

An object of the present invention is to provide a folding baby seat for grocery carts which is located without the storage space of the cart and which does not detract from nesting or telescoping of the carts so that many carts may be stored in a small space.

A further object is to provide a folding baby seat for grocery carts which is located without the storage space of the cart and is adapted to collapse when the end gate of the cart is moved to a nesting position, the seat being provided with locking mechanism whereby in use the seat is secured in place and prevented from folding; and the end gate is locked against rising movement when a child is in the seat. Other objects of the invention will be readily perceived from the following description.

This invention relates to a collapsible baby seat for use with a grocery cart having a movable end gate or flipper to permit telescopic storage or nesting of a plurality of carts. The seat is placed without the basket permitting use of the complete storage capacity of the cart and is supported from the cart handle and the end gate. The seat is adapted to collapse or fold upon upward movement of the end gate to a position to permit nesting of a plurality of carts. Preferably, the seat is provided with locking mechanism which prevents substantial movement of the end gate or collapse of the seat when a child is placed in the seat.

The attached drawings illustrate a preferred embodiment of the invention, in which Figure 1 is a view in elevation of a grocery cart provided with the baby seat of the present invention;

Figure 3 is a view in rear elevation of the seat shown in Figure 2;

Figure 4 is a view in side elevation similar to Figure 2 except that the seat is shown in folded or collapsed position when it is desired to nest or telescope a plurality of carts; and Figure 5 is a view in elevation showing a modified form of seat.

Figure 6 is a plan view of the seat.

Figure 1:
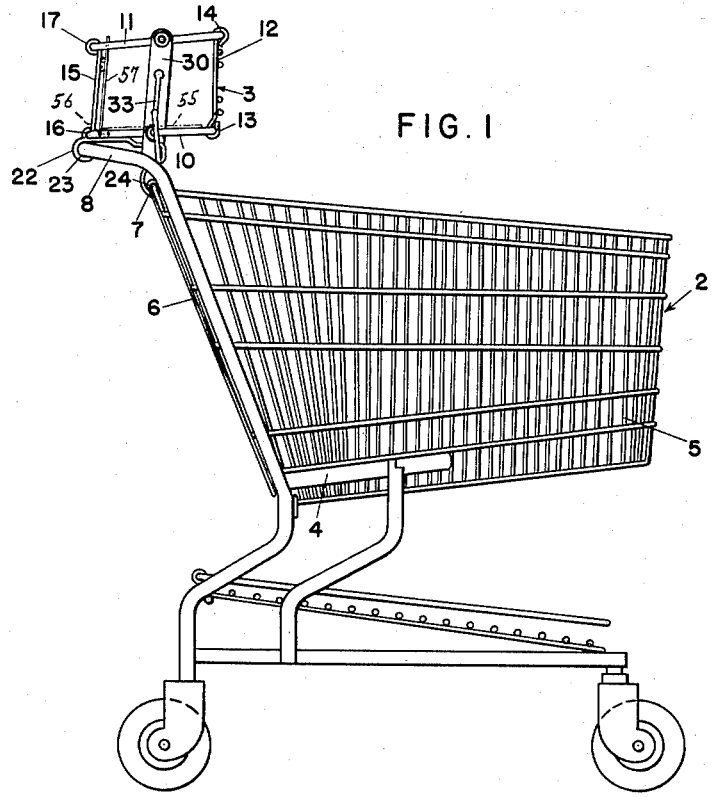

Referring to the attached drawings, there is shown a grocery cart 2 of a nesting or telescoping type provided with the folding baby seat 3 of the present invention. The grocery cart 2 includes the usual frame work 4 to support a basket 5 having a swingable end gate or flipper 6. The end gate 6 is pivotally supported from a bar 7 forming a part of the frame work which extends horizontally across the rear of the basket. The usual handle 8 is provided by which the cart may be pushed or pulled.

The seat 3 includes a base 10 which consists of a bar bent in rectangular form, a top member 11 formed similarly to base 10, a rear back member 12 extending between base 10 and top member 11 and pivotally connected to the base and to the top member as shown at 13, 14 respectively, and substantially vertically extending bar members 15 placed adjacent the front corners of the seat and pivotally connected to the base and to the top member as shown at 16, 17 respectively.

Figure 2:
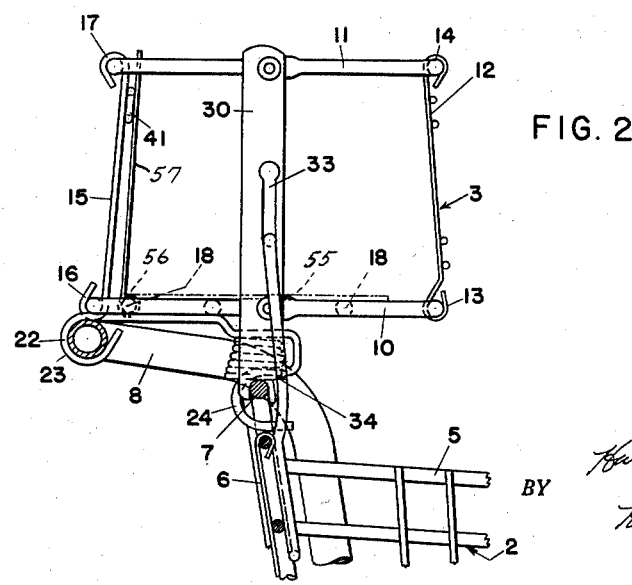
Figure 2 is a view in side elevation of the seat shown in Figure 1 in use to illustrate the locking mechanism.

A plurality of bars 18 extend across the base, being attached to opposite sides of the base, to provide additional support for the base. A seat cover 19 extends across the base between the front and rear portions thereof, the front and rear portions 20, 21 of cover 19 being folded about the base to attach the cover thereto. Support members 22 for base 10 are hooked about handle 8 as shown at 23 and extend below the base 10, as shown in Figure 2, being attached thereto and terminate in hook members 24 bent about end gate support bar 7.

The locking mechanism comprises plate members 30 extending from top member 11 downwardly to base 10, the plates 30 extending beyond base 10, for a purpose hereinafter described. Plate members 30 are hinged or pivoted to top member 11 as shown at 31 and are hinged or pivoted to base 10 as shown at 32. Each plate 30 contains a slot 33 extending longitudinally thereof. The extended ends of plates 30 below base 10 are provided with notches 34 hereinafter described. Bar-shaped collapsing member 35 extends across end gate 7 and has terminal portions bent upwardly and inwardly to extend in slots 33. When the seat 3 is moved downward, for example, when a child is placed therein and the child's weight urges the seat down, the notches 34 engage bar 7 (as shown in Figure 2) preventing further downward movement of the seat and locking the seat in place to prevent collapse thereof and any substantial swinging movement of the end gate 6.

Preferably, the seat is resiliently mounted in place as by springs 36 placed between base 10 and support bar 7. These springs are compressed when the seat is in use; when the compressive forces are removed as by removal of the child the springs 36 return the seat to original position, removing plates 30 from bar 7 to permit swinging of the end gate in a counterclockwise position and collapse or folding of the seat if desired to permit nesting or telescoping of a plurality of carts.

Preferably, a reenforcing member 40 is provided centrally of the front portion of the seat, member 40 extending substantially between the top member 11 and the base 10 and being pivotally connected to the base. A horizontally extending member 41 extends adjacent top member 11 and connects bar member 15, reenforcing member 40 being attached to member 41 to form a strong front support for the seat.

In use, a child is placed in the seat, facing rearwardly of the cart, with his legs extending on either side of member 40 and over handle 8. The weight of the child compresses springs 36 to move the seat downward to a position in which bar 7 is engaged in the notches 34 of plate members 30 thereby locking the seat in position to prevent collapse thereof and preventing substantial movement of the end gate. When the weight of the child is removed from the seat, springs 36 urge the seat to original position thereby unlocking the seat and gate to permit nesting or telescoping of a plurality of carts.

When it is desired to nest a plurality of carts for storage purposes in order that they may not occupy too great space, the end gate 6 is pivoted about bar 7 (in a counter clockwise direction as viewed in the drawing) toward the front of the cart, thereby raising the gate. Raising the gate raises an end of collapsing member 35 which is attached to the gate thereby lowering the opposite ends of member 35 which ride in the slots 33 of plates 30. These ends of member 35 moving along slots 33 pull top member 11 downward, back member 12 and bar members 15 being pivoted to the base and to the top member, thereby folding or collapsing the seat.

In Figure 5, I have shown a modification of the seat of the present invention. In this embodiment handle 45 is extended, and seat 46 is placed substantially completely above the basket (not shown). This permits the child's legs to fit between the end gate 47 and the handle 45 which provides more space on the handle to permit wheeling of the cart and places the child's feet in a position where kicking is less pronounced. A further advantage resides in the fact that the center of gravity is moved forward in the cart thus decreasing possibilities of back tipping. Bar members 48 extend from the handle 45 above the storage space to receive the seat. In addition, rods 49 extend from the end gate 7 support bar 50 to provide additional support for the seat. In other respects, the construction of the seat and cart is the same as previously described.

It will be understood that with both constructions described above, a shopper may use the cart and may not be accompanied by a child so that the seat is not used by a child. In such case, the shopper may employ the seat for holding bottle goods, pocketbooks, etc. It is desirable to provide means for closing the leg openings of the seat when the seat is used as a container or basket; and in Figures 1, 2 and 5, there is shown a metal closure member 55 which rests or lies on the cover 19 of the seat during normal use without interfering in any way with use of the seat by a child. The closure member 55 is hinged as shown at 56. When it is desired to use the seat for holding bottle goods or a pocketbook, for example, the closure member 55 is raised to an upright position as shown at 57 thereby closing the holes provided for legs. In such position, the member 40 serves as a stop for the closure member. Preferably, as shown in Figure 5, angle members 58 are attached to the sides of the seat. Members 58, of course, prevent a pocketbook or bottle goods stored in the basket from falling through the sides of the seat. In the embodiment shown in Figures 1 and 2 the plate members 30 prevent such articles from falling through the sides of the seat.

While the closure member and angle members are shown specifically in the embodiment illustrated in Figure 5, it is obvious that such members are preferably employed in the embodiments illustrated in the remaining figures.

The present invention provides a collapsible baby seat for a grocery cart which is disposed outside of the basket thereby assuring adequate storage space within the basket. Indeed, the present seat provides additional storage space when it is not used for carrying a child since the seat may be used for the customer's pocketbook or various grocery articles and means are provided to assure that the pocketbook, etc. does not fall from the seat during such use. When the child is placed in the seat of the present invention, it is above the handle which is back of the basket and of course outside the basket thus assuring more sanitary conditions.

A major advantage of the present invention resides in the fact that it is impossible for the seat to fold or for substantial movement of the end gate when the child is placed in the seat. The seat lowers and locks back of the flipper bar thus preventing the child from falling over the handle and prevents the seat from collapsing when the child is in the seat.

An additional advantage of the present invention resides in the nesting feature of carts provided with the collapsible seat of the present invention. The seat folds flat when one cart is nested into another permitting the cart to be moved under rails separating entrance and exit points from the store proper.

While I have described a preferred embodiment of my invention, it will be understood my invention is not limited thereto since it may be otherwise embodied within the scope of the following claims.

I claim:

1. In combination with a grocery cart, including a cart handle, a support for an end gate on said cart, and a movable end gate on said support, a collapsible baby seat placed without the cart thereby permitting use of the complete storage capacity of the cart, said seat including support members connected to the cart handle and to end gate support to support the seat therefrom and collapsing means on said seat actuated by pivotal movement of the end gate toward the front of the cart to collapse the seat and to permit telescopic storage of a plurality of carts.

2. The combination according to claim 1 in which the seat includes locking mechanism in combination with said collapsing means coupled to said end gate to prevent substantial movement of the end gate and collapse or folding of the seat when the seat is in use.

3. The combination according to claim 1 in which the seat structure comprises a base, a top member spaced from the base, a backing member pivotally connected to the base and to the top member, and bar members extending between the base and top member pivotally connected to the base and to the top member.

4. The combination according to claim 3 in which the seat includes plate members placed on opposite sides of the seat and pivotally connected to the top member and the base, said plates having slots therein, and said collapsing means include a collapsing member having elements thereof extending through the slots, whereby the collapsing means fold the seat upon pivotal movement of the gate toward the front of the cart.

5. The combination according to claim 4 in which the plate members extend below the plane of the base and terminate in notches adapted to receive the top bar of the gate thereby locking the seat in place when it is in use.

6. The combination according to claim 5 in which spring members extend between the end gate support and the seat.

7. The combination according to claim 6 in which a reinforcing member is provided at the front of the seat extending substantially between the top member and the base and pivotally connected to the base.

8. The combination according to claim 1 in which the seat has leg openings through which the legs of a child may extend, and a closure member is provided to close the leg openings of the seat when it is not occupied by a baby and it is desired to employ the seat for storage purposes.

9. In combination with a nestable shopping cart including a merchandise containing compartment: a collapsible baby seat structure coupled to a wall of said compartment; said seat structure having a base; a wall extending upwardly from the base and having leg holes through which the legs of a child seated in the structure may extend; and a substantially flat member coupled to said structure independently of said base and movable from a substantially horizontal position on top of said base where it provides a seat for the child to a substantially vertical position alongside of said wall, said member being of sufficient size to provide a closure for said leg holes, the construction and arrangement being such that the seat structure may be employed to contain merchandise when the member closes said leg holes.

10. The combination of claim 9 wherein the seat structure is mounted above the compartment.

References Cited in the file of this patent

UNITED STATES PATENTS

| | | | |
|---|---|---|---|
| 508,726 | Lange | Nov. 14, | 1893 |
| 843,094 | Paterson et al. | Feb. 5, | 1907 |
| 1,074,438 | Kimpel | Sept. 30, | 1913 |
| 2,426,432 | Breckner | Aug. 26, | 1947 |
| 2,508,670 | Goldman | May 23, | 1950 |
| 2,615,726 | Brottman | Oct. 28, | 1952 |
| 2,620,017 | Ford | Dec. 2, | 1952 |
| 2,662,775 | Goldman | Dec. 15, | 1953 |
| 2,769,645 | Young | Nov. 6, | 1956 |
| 2,813,725 | Hoedinghaus | Nov. 19, | 1957 |

FOREIGN PATENTS

| | | |
|---|---|---|
| 480,939 | Great Britain | Mar. 2, 1938 |